(12) United States Patent
Adam

(10) Patent No.: US 9,732,292 B2
(45) Date of Patent: Aug. 15, 2017

(54) CORROSION REDUCTION FOR SUPERCRITICAL WATER GASIFICATION THROUGH SEEDED SACRIFICIAL METAL

(71) Applicant: Empire Technology Development LLC, Wilmington (DE)

(72) Inventor: Quentin Arthur Carl Adam, North Parramatta (AU)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/767,188

(22) PCT Filed: Mar. 20, 2013

(86) PCT No.: PCT/US2013/033191
§ 371 (c)(1),
(2) Date: Aug. 11, 2015

(87) PCT Pub. No.: WO2014/149045
PCT Pub. Date: Sep. 25, 2014

(65) Prior Publication Data
US 2016/0017243 A1    Jan. 21, 2016

(51) Int. Cl.
*B08B 17/00* (2006.01)
*C23F 11/00* (2006.01)
(Continued)

(52) U.S. Cl.
CPC .............. *C10J 3/723* (2013.01); *B01J 3/002* (2013.01); *B01J 3/008* (2013.01); *C10J 3/00* (2013.01);
(Continued)

(58) Field of Classification Search
CPC .. A61L 2/00; C23F 11/00; C23F 15/00; C23F 17/00
(Continued)

(56) References Cited

U.S. PATENT DOCUMENTS 4,975,116 A    12/1990   Basen et al.
4,976,776 A    12/1990   Elvander et al.
(Continued)

FOREIGN PATENT DOCUMENTS

CN    101285657 A    10/2008
CN    101602558 A    12/2009
(Continued)

OTHER PUBLICATIONS

"Commodity Prices," Accessed at http://web.archive.org/web/20130318012339/http://www.indexmundi.com/commodities/, Accessed on Sep. 4, 2014, pp. 4.
(Continued)

*Primary Examiner* — Monzer R Chorbaji
(74) *Attorney, Agent, or Firm* — Turk IP Law, LLC

(57) ABSTRACT

Technologies are presented for reducing corrosion M supercritical water gasification through seeded sacrificial metal particles. The metal panicles may be seeded into one or more material input streams through high pressure injection. Once distributed in the SCWG reactor, the metal particles may corrode preferentially to the metal SCWG reactor walls and convert into metal oxides that precipitate out above the supercritical point of water. The precipitated metal oxides may then be collected downstream of the SCWG reactor to be reprocessed back into seed metal at a smelter. The seeded metal particles may complete a process material cycle with limited net additional waste.

20 Claims, 7 Drawing Sheets

(51) Int. Cl.
| | |
|---|---|
| *C10J 3/72* | (2006.01) |
| *C10J 3/00* | (2006.01) |
| *C10J 3/78* | (2006.01) |
| *C10L 9/08* | (2006.01) |
| *B01J 3/00* | (2006.01) |
| *C10J 3/48* | (2006.01) |
| *G05B 15/02* | (2006.01) |

(52) U.S. Cl.
CPC ............... *C10J 3/485* (2013.01); *C10J 3/78* (2013.01); *C10L 9/086* (2013.01); *G05B 15/02* (2013.01); *B01J 2219/00245* (2013.01); *C10J 2300/093* (2013.01); *C10J 2300/0916* (2013.01); *C10J 2300/0979* (2013.01); *C10J 2300/0983* (2013.01); *C10J 2300/1853* (2013.01); *Y02P 20/544* (2015.11)

(58) Field of Classification Search
USPC .................................................. 422/6–7, 292
See application file for complete search history.

(56) References Cited

U.S. PATENT DOCUMENTS

| | | | |
|---|---|---|---|
| 5,339,621 A * | 8/1994 | Tolman | C02F 1/025 110/229 |
| 5,620,606 A | 4/1997 | McBrayer et al. | |
| 2006/0243602 A1 | 11/2006 | Andersen et al. | |
| 2010/0237291 A1 | 9/2010 | Simmons et al. | |
| 2013/0105378 A1 | 5/2013 | Want et al. | |

FOREIGN PATENT DOCUMENTS

| | | |
|---|---|---|
| CN | 101973621 A | 2/2011 |
| CN | 102557361 A | 7/2012 |
| JP | 2007046027 A | 2/2007 |
| WO | 9627558 A1 | 9/1996 |

OTHER PUBLICATIONS

"Galvanic series," Accessed at http://web.archive.org/web/20130818104048/http://en.wikipedia.org/wiki/Galvanic_series, last modified on Apr. 23, 2013, pp. 4.

"WEIR Minerals," Accessed at http://web.archive.org/web/20130130141205/http://www.weirminerals.com/default.aspx, Accessed on Sep. 4, 2014, pp. 3.

International Search Report and Written Opinion in International PCT Application No. PCT/US2012/33191 mailed Jun. 5, 2013.

Marrone, P. A. and Hong, G. T., "Corrosion Control Methods in Supercritical Water Oxidation and gasification Processes," Paper 08422, NACE Corrosion Conference & Expo, pp. 83-103 (2008).

* cited by examiner

CORROSION REDUCTION FOR SUPERCRITICAL WATER GASIFICATION THROUGH SEEDED SACRIFICIAL METAL

This Application is the U.S. National Stage filing under 35 U.S.C. §371 of International Application No. PCT/US2013/33191 filed on Mar. 20, 2013. The International application is hereby incorporated by reference in its entirety.

BACKGROUND

Unless otherwise indicated herein, the materials described in this section are not prior art to the claims in this application and are not admitted to be prior art by inclusion in this section.

A supercritical fluid may form when a substance, such as water, may reach a pressure and temperature above its critical paint. Supercritical water may occur at pressures higher than 218 atm and temperatures above 374° C. One example application of supercritical water is in treating biomass with supercritical water and in the absence of added oxidants, which may convert organic material into fuel gases.

Applications and devices that use supercritical water may suffer from severe corrosion. Supercritical water gasification (SCWG) is one application that may be prone to corrosion because of the use of coal or similar materials in the process. Coal, tar, or oil, which includes impure hydrocarbons, may lead to the dissolution of highly reactive chemical species at thermodynamic conditions just below the critical point of water. These highly reactive chemical species may increase corrosion rates of the metal walls within the SCWG reactor.

SUMMARY

The present disclosure generally describes technologies for reducing corrosion in supercritical water gasification through seeded sacrificial metal particles.

According to some examples, a method is provided for reducing corrosion in supercritical water gasification. The method may include seeding one or more material input streams into a supercritical water gasification (SCWG) reactor with metal particles such that the metal particles corrode to metal oxides on SCWG reactor walls and precipitate above a supercritical point. The method may further include collecting the metal oxides from the SCWG reactor.

According to other examples, a supercritical water gasification (SCWG) reactor system with corrosion reduction is described. The SCWG reactor system may inc hide a SCWG reactor that may be configured to heat a mixture that includes water above a supercritical point. The SCWG reactor system may further include a first input configured to provide the mixture to the SCWG reactor, a second input configured to provide water to the SCWG reactor, and an output configured to retrieve a reaction mixture out of the SCWG reactor. One or more of the first and second inputs may be seeded with metal particles such that the metal particles corrode to metal oxides on SCWG reactor walls and precipitate above the supercritical point, and the metal oxides may be collected from the SCWG reactor.

According to further examples, a controller for a supercritical water gasification (SCWG) reactor system with corrosion reduction is described. The controller may include one or more injection modules coupled to one or more material input streams of a SCWG reactor, where the injection modules may be configured to seed the one or more material input streams with metal particles such that the metal particles corrode to metal oxides on SCWG reactor walls and precipitate above a supercritical point. The controller may further include at least one retrieval module coupled to an output of the SCWG reactor, where the retrieval module may be configured to collect the metal oxides from the SCWG reactor.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
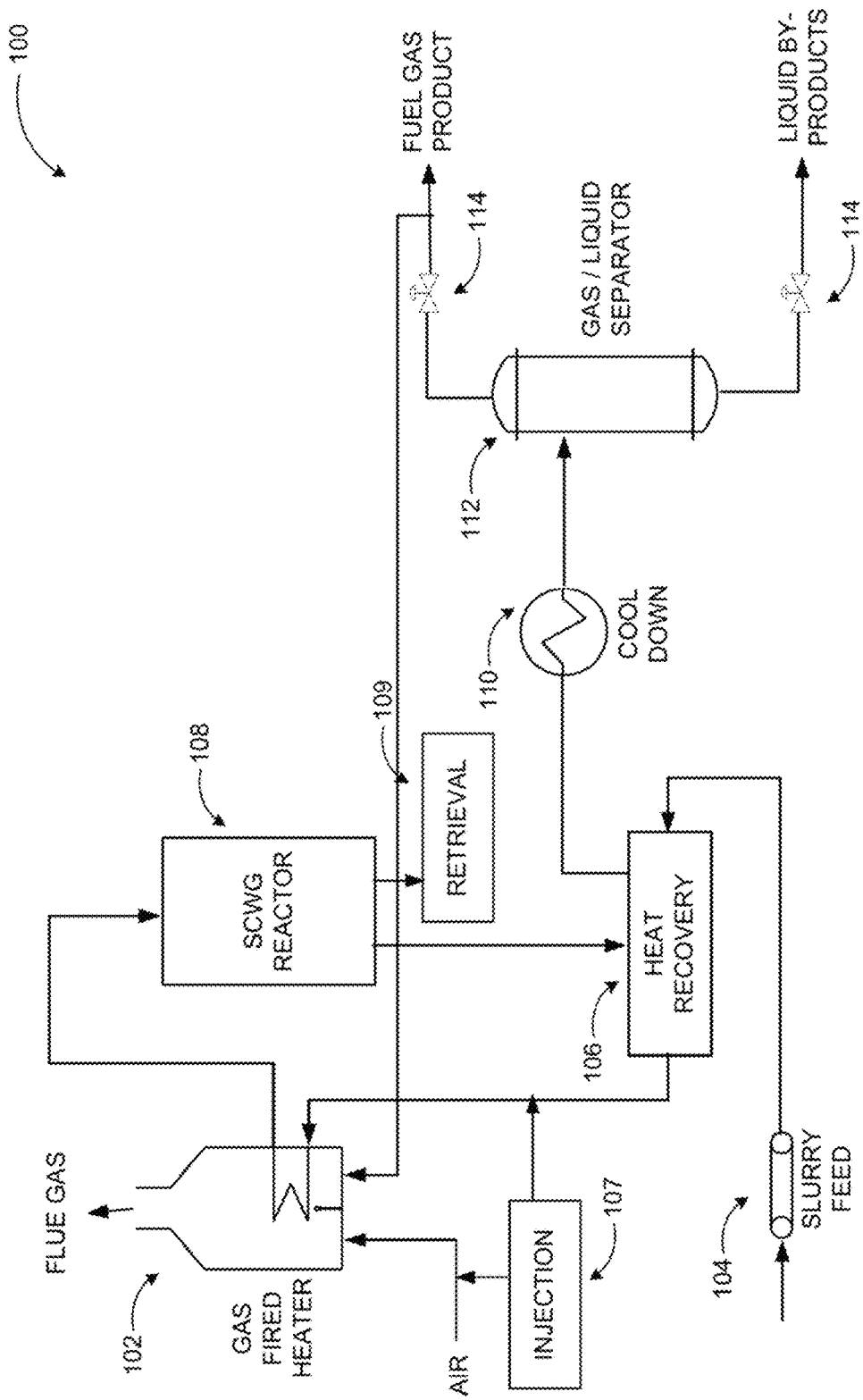
FIG. 1 illustrates an example supercritical water gasification (SCWG) process flow diagram.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn to methods, apparatus, systems, devices, and computer program products related to corrosion control for supercritical water gasification (SCWG) through seeded sacrificial metal.

Briefly stated, technologies are generally described for reducing corrosion in SCWG through seeded sacrificial metal particles. The metal particles may be seeded into one or more material input streams through high pressure injection. Once distributed in the SCWG reactor, the metal particles may corrode preferentially to the metal SCWG reactor walls and convert into metal oxides that precipitate out above the supercritical point of water. The precipitated metal oxides may then be collected downstream of the SCWG reactor to be reprocessed back into seed metal at a smelter or otherwise disposed of. The seeded metal particles may complete a process material cycle with limited, net additional waste.

FIG. 1 illustrates an example supercritical water gasification (SCWG) process flow diagram, arranged in accordance with at least some embodiments described, herein.

As shown in a diagram 100, an example coal based SCWG plant may include a gas fired heater 102 with one or more material input streams for feeding water, coal slurry and fuel gas, for example. The coal slurry provided through a slurry feed 104 may be heated in the gas fired heater 102 and provided into the SCWG reactor 108 along with water as a mixture. The superheated coal slurry retrieved from the SCWG reactor 108 may be cooled at a heat recovery module 106 before being fed back into the gas fired heater 102. A mixture of liquid and gas byproducts of the reaction in the SCWG reactor 108 may be subjected to further cool down (110) following heat recovery and separated into gas and liquid byproducts in a separator 112. The liquid and gas byproducts may then be recovered through different recovery lines controlled by valves 114.

The water/coal slurry mixture in the SCWG reactor may be subjected to high pressure and temperature exceeding the critical point of water and causing supercritical water to form. The two-phase gas-liquid product emerging from the SCWG reactor 108 may pass through the heat recovery module 106 to maximize thermal efficiency. The gas phase may form fuel gas product upon separation from the liquid phase and may be reused to provide heat to the process within the gas fired heater 102.

Sacrificial corrosion techniques may be used conventionally in non-continuous processes to help protect applications and devices prone to corrosion. The sacrificed metal, acting as an anode, attaches to regions of a metal structure being protected from corrosion and may be consumed by corrosion resulting in frequent replacement of the sacrificial metal. In a continuous process, such as SCWG, and in the hot, high pressure environment within a SCWG reactor, installing metal anodes for sacrificial corrosion may not be possible without a process system shutdown, which may increase production costs. Also, as the SCWG reactions may be aggressive, installing metal anodes in the reactor may solely protect the reactor walls in the immediate vicinity of the metal anode. The entire inside surface of the reactor may need to be lined with metal anodes in theory to achieve complete protection. For at least these reasons, conventional sacrificial electrodes are often not ideal in SCWG reactors.

According to some embodiments, sacrificial metal particles may be seeded into one or more of the material input streams through high pressure injection or similar mechanisms (for example, injection module 107). The material inputs may be water along with one or more of coal, tar, tar sands, heavy oils, biomass, and waste oil. The metal particles corrode just before and within the reactor and by seeding may be dispersed through the working fluids within the SCWG reactor avoiding localized corrosion. The metal particles may be added upstream to the reactor, for example before the pumps, which may allow the process to be continuous and may avoid expensive shutdowns.

The metal oxides produced from the corroded metal particles may be separated and collected for reprocessing back into metal at a smelter, or otherwise disposed of. Separation may occur because the fluid mix is highly electrolytic in supercritical water just below the critical point where corrosion is most aggressive and is non-polar above the critical point. As a result, the products of the sacrificial, reaction, metal oxides, may precipitate out. The collection of the metal oxides may be controlled by a retrieval module 109, which may be coupled to an output of the SCWG reactor and receive the precipitated metal oxides from the reaction mixture from within the SCWG reactor. In some examples, the chemical kinetics of the oxidation of metal particles into metal oxides may depend on several factors. The concentration of corrosive metal particles, the pressure, and the temperature may be governed by the gasification process, but the type of metal used as a seeded metal particle along with the quantity, size and shape of the metal particles may be controlled independently. For example, the metal particles may be selected in sizes from about 1 nm to about 5 mm, but embodiments are not limited to those sizes.

The surface area of the metal particles may also have a large effect on the overall sacrificial reaction rate. Many small particles may react quicker than a large single particle and a sheet/flake shaped particle may react quicker than a spherical particle of equivalent mass. The metal particles may be small enough to pass through mechanical pumps, but many large industrial pumps may be designed to handle solid waste and slurries and have appropriate clearances between rotors and casings. The metal particles introduced into the process may also be of a softer grade to reduce erosion within the pumps and the casings, which may need to be hardened or ceramic coated.

According to further examples, different types of seed metal particles may be added to the process with different reaction rates to control corrosion at different stages of the processes so that the least reactive metal may provide corrosion protection later in any heat exchangers downstream (including other types of SCW processes). For example, titanium, a less reactive seed metal, may protect hardware furthest downstream.

The chemical reactivity of metal relates to the electronegativity of the metal within the galvanic series relative to the metal being protected from corrosion. The galvanic series describes common metal reactivity in the following order starting with the most reactive: magnesium, aluminium, steel/iron, copper, and titanium. The reactivity may also depend on the chemical environment, temperature and the alloy of the metal that may be protected within the SCWG reactor. For example, magnesium may react quickly but aluminium may be slower reacting because of a tough oxide coating that slows the initial reaction rate.

Metal particle seeding may be more economically attractive if the metal of choice is a commodities base metal. Steel may be a less expensive sacrificial metal, for example, followed by aluminium at current pricing. The amount of seed metal may depend on the corrosion rate of the inside of the SCWG reactor walls and the throughput of the material inputs. As described above, at temperatures and pressures above the critical point of water metal oxides may be produced from the sacrificial seed metal, precipitate out, and may be collected downstream of the SCWG reactor. For example, aluminium may produce oxide alumina and steel may produce hydrated iron oxide and/or hematite. Selling these oxides to smelters may offset some of the cost of the seed material and may remove the environmental challenge of having to store waste material.

Use of the described methods and materials can result in a reduction or elimination of corrosion in a SCWG reactor relative to operation of the same or similar SCWG reactor without the described methods and materials. The degree of corrosion can generally be reduced by any amount. For example, the degree of corrosion can be reduced by at least about 10%, at least about 20%, at least about 30%, at least about 40%, at least about 50%, at least about 60%, at least about 70%, at least about 80%, at least about 90%, at least about 95%, at least about 96%, at least about 97%, at least about 98%, at least about 99%, and in an ideal situation, about 100% reduction (complete elimination of corrosion).

Figure 2:
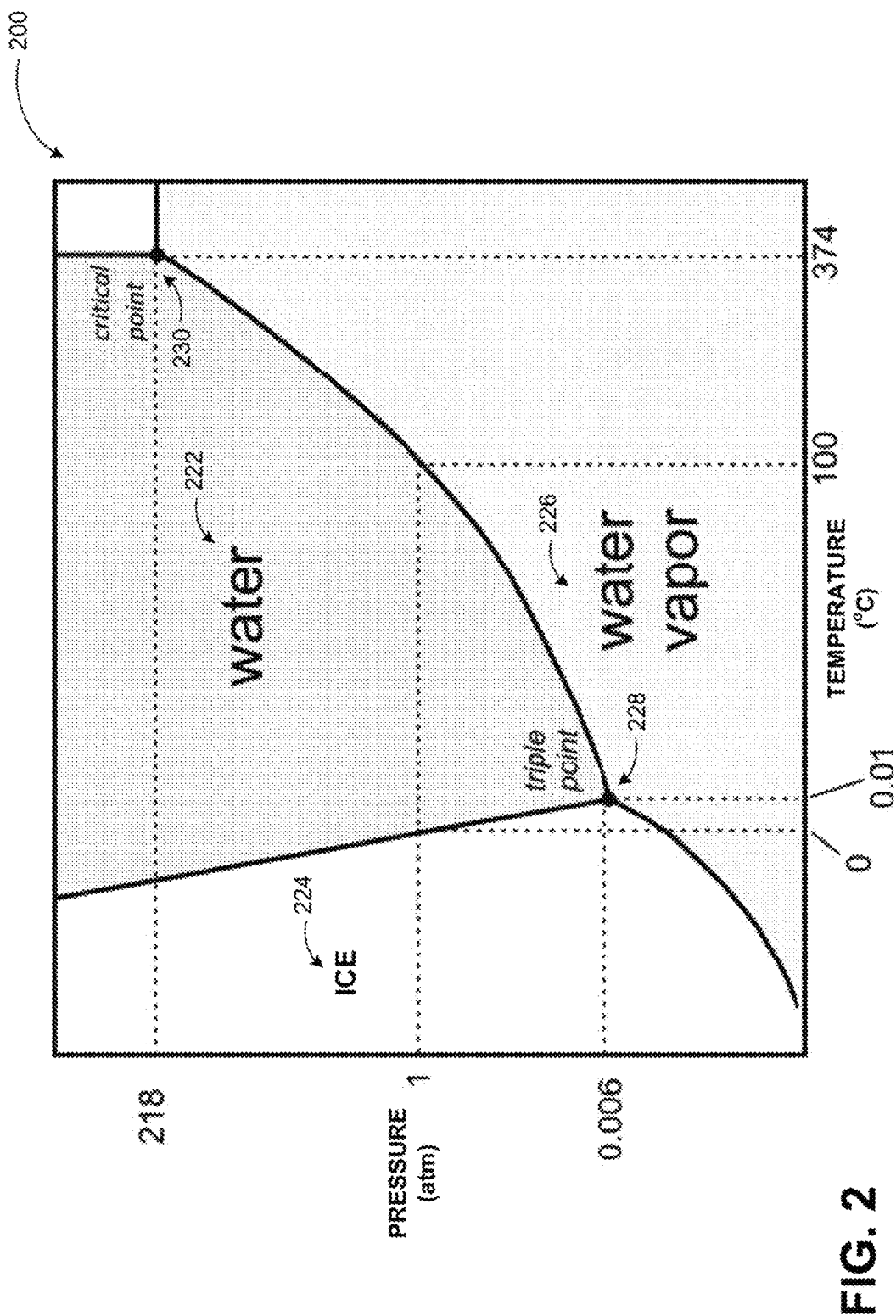
FIG. 2 illustrates a pressure-temperature diagram for formation of supercritical water.

FIG. 2 illustrates a pressure-temperature diagram for formation of supercritical water, arranged in accordance with at least some embodiments described herein.

As shown in a diagram 200, water may exist in three phases, liquid water 222, solid ice 224, and gaseous water vapor 226. At a triple point 228, the pressure and temperature may be such that each of the three phases of water may exist equally. For water, the triple point 228 may occur at a pressure of about 0.006 atm and a temperature of about 0.01° C. At a critical point 230, the pressure and temperature may be such that gaseous water vapor 226 and the liquid water 222 phases may merge to form one phase, supercritical water. Supercritical water (SCW) may occur at pressures higher than about 218 atm and temperatures above 374° C.

Figure 3:
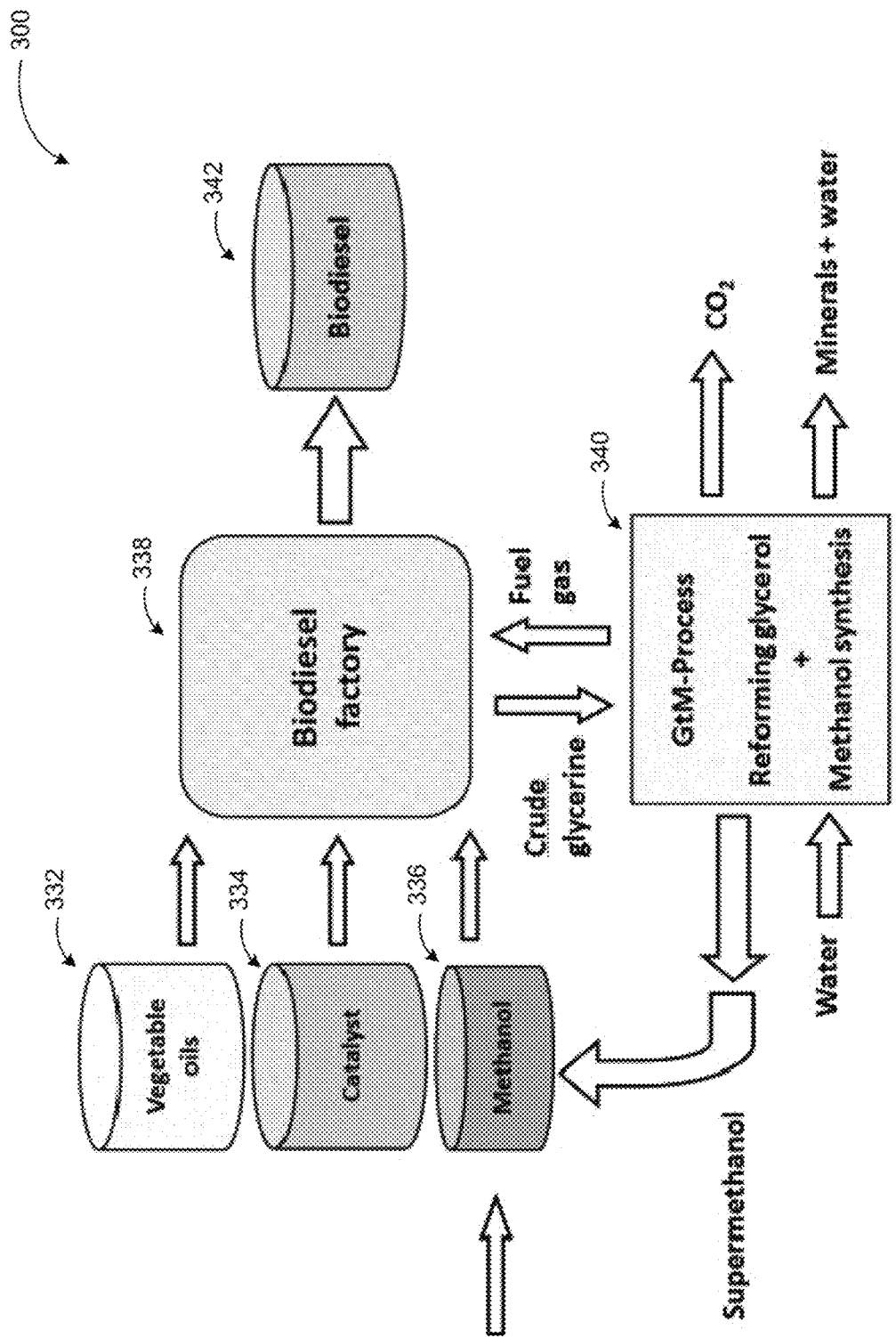
FIG. 3 illustrates an example methanol production from glycerol, where the syngas for the methanol is obtained in a reforming process in supercritical water.

FIG. 3 illustrates an example methanol production from glycerol, where the syngas for the methanol is obtained in a reforming process in supercritical water, arranged in accordance with at least some embodiments described herein.

As shown in a diagram 300, vegetable oils 332, a catalyst 334, and methanol 336 may serve as feedstock for reformation in supercritical water within a biodiesel factory 338. Glycerol may be a by-product of the factory production, which may then be reformed and synthesized into a renewable syngas of methanol, super-methanol, through the Glycerol to Methanol (GOA) Process 340. Biodiesel 342 may be an additional byproduct of the factory production.

According to some examples, GtM may involve two integrated processes; each may operate at a pressure of approximately 247 atm. The first process may reform glycerol in supercritical water to produce $H_2$, CO, $CO_2$, $CH_4$, and higher hydrocarbons, which may then be separated from the water phase. The second process may convert the gases into super-methanol in a packed bed reactor. Super-methanol is a renewable syngas of methanol that may be used in successive GtM processes.

Combining, the reformation of glycerol in supercritical water and methanol synthesis in the GtM process may be less energy intensive than compressing a gas, which is used in standard methanol synthesis. High pressures provided by SCWG may be favorable for the position of the equilibrium and the reaction rates in methanol synthesis. Additionally, the conditions for methanol synthesis may allow complete conversion of the limiting component obtained per pass through the reactor, which may allow the omission of recycle streams of unconverted syngas. Furthermore, the GtM process may make biodiesel production more environmentally friendly, may reduce the dependency on volatile market prices, and may secure the supply of methanol which may improve biodiesel economics.

Figure 4:
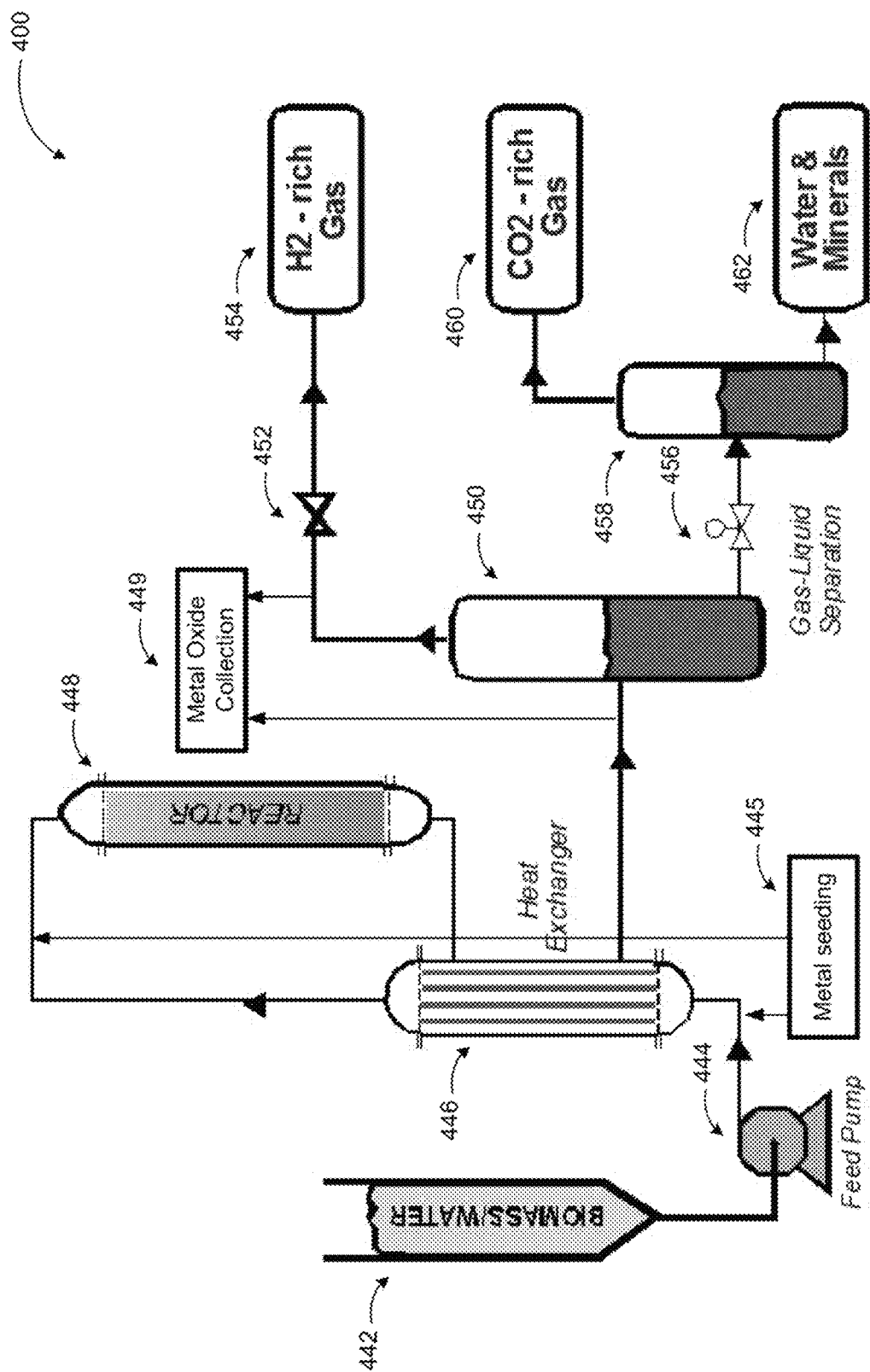
FIG. 4 illustrates another example process for reforming in supercritical water.

FIG. 4 illustrates another example process for reforming in supercritical water, arranged in accordance with at least some embodiments described herein.

As shown in a diagram 400, feedstock 442, a mixture of biomass and water, may flow through a feed pump 444 that may increase the pressure of the mixture. The mixture of biomass and water 442 may then continue to a heat exchanger 446 containing an inlet and an outlet to a SCWG reactor 448, into which the mixture may further flow at an increased temperature. The pressure and temperature within the SCWG reactor 448 may exceed the critical point of water, forming supercritical water, which may convert biomass into fuel gases. A two-phase gas-liquid product may emerge from the SCWG reactor 448, which may be separated in a high-pressure gas-liquid separator 450. The gas phase may be separated from the liquid phase by cooling 452, which may result in hydrogen rich gas 454. The remaining liquid phase may then be further cooled (456) and transferred to a low-pressure gas-liquid separator 458, which may result in carbon dioxide rich gas 460 and water and minerals 462.

The process for reforming in supercritical water may use a feed pump 444, a heat exchanger 446, a SCWG reactor 448, a high-pressure gas-liquid separator 450, and a low-pressure gas-liquid separator 458. The SCWG reactor may operate at a temperature of about 600° C. to about 650° C. and at a pressure around 296 atm, conditions above the critical point of water. The heat exchanger 446 may provide heat exchange between the inlet and outlet streams from the SCWG reactor 448, which may allow high thermal efficiency.

According to other examples, treatment of biomass in supercritical water may convert organic substrates within the biomass into fuel gases. The conversion may take up to 2 minutes, depending on the type of feedstock used. Interactions between the supercritical water and organic. substrates gradually change as the relationship between water and temperature changes. Water may become a strong oxidant as the temperature increases to about 600° C., which may degrade the organic substrate as the oxygen from water transfers to a carbon atom of the substrate. Carbon preferentially oxidizes into $CO_2$ due to its high density, but low concentrations of CO may also be formed. The hydrogen atoms of water and the organic substrate may be released to form the primary production gas, $H_2$.

The gases separated from the high-pressure gas-liquid separator 450 may primarily contain $H_2$, along with CO, $CH_4$ and part of the $CO_2$. The hydrogen that may be produced through SCWG may contrast from the syngas produced in common thermal biomass gasifiers. The hydrogen content may be higher, there may be no dilution by nitrogen, and the gas may be clean with minimal CO and $CH_4$. Furthermore, the gas separated from the low-pressure gas-liquid separator 458, may contain large amounts of $CO_2$ and some combustibles. These gas byproducts may be reused for process heating purposes.

To reduce corrosion within the SCWG reactor 448, metal particles may be seeded to the reactor along with material inputs as discussed previously. The metal seeding 445 may occur at one or various points prior to the SCWG reactor 448. The oxidized and precipitated metal particles (metal oxides) may be retrieved from the output of the reactor again at various points. The metal oxide collection 449 may be performed through one or more collection modules, which may provide the metal oxides to a central collection system for re-processing in some examples.

The examples in FIGS. 1 through 4 have been described using specific SCWG processes and conditions in which sacrificial seeding of metal particles may be implemented. Embodiments for the sacrificial seeding of metal particles are not limited to the SCWG processes and conditions according to these examples.

Figure 5:
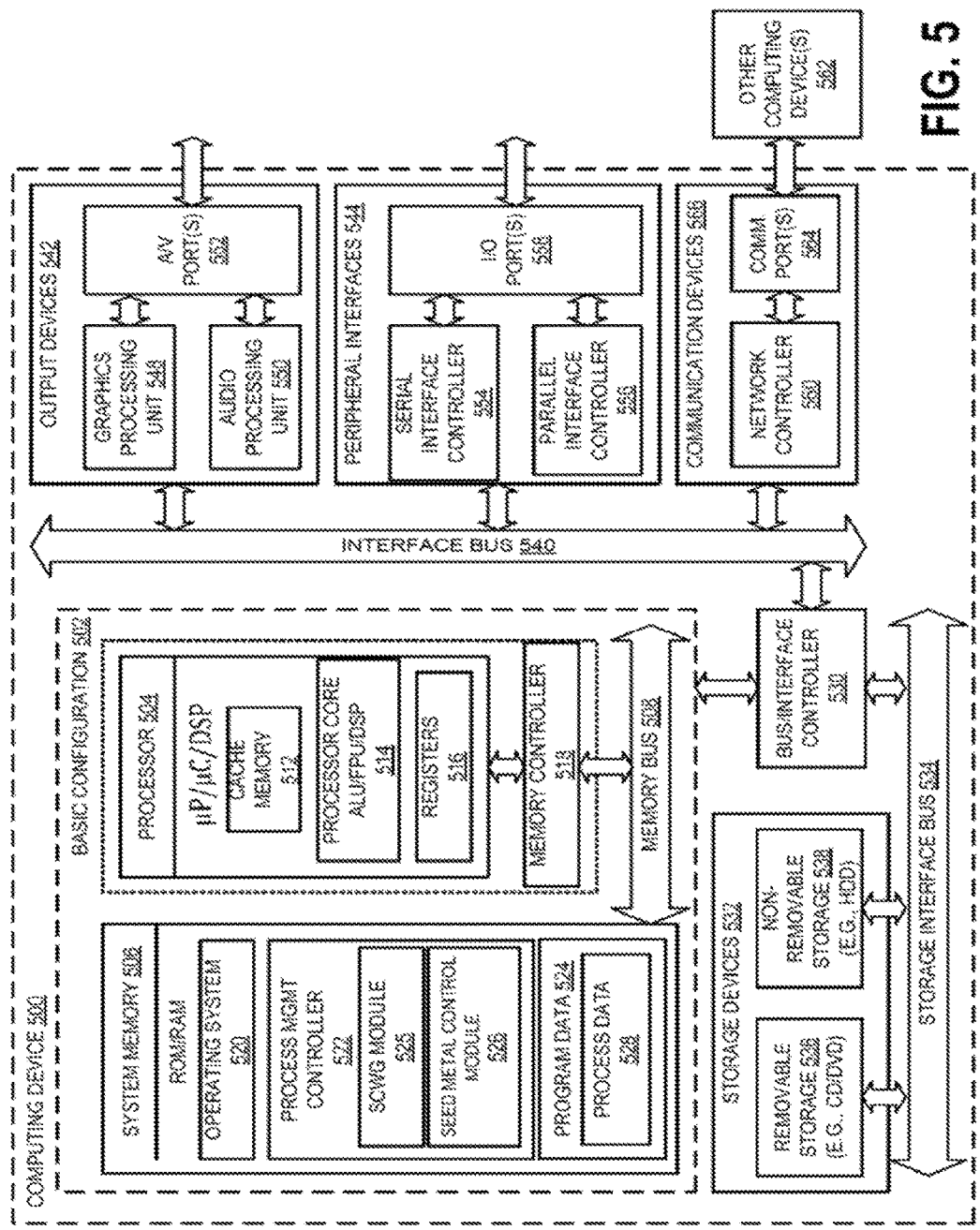
FIG. 5 illustrates a general purpose computing device, which may be used for controlling a SCWG reactor.

FIG. 5 illustrates a general purpose computing device, which may be used for controlling a SCWG reactor, arranged in accordance with at least some embodiments described herein.

For example, the computing device 500 may be used to control a SCWG reactor as described herein. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one or more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations, the memory controller 518 may be an internal pan of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a process management controller 522, and program data 524. The process management controller 522 may include a SCWG module 525 and a seed metal control module 526 to control a SCWG reactor and seeding of metal particles as described herein. The program data 524 may include, among other data, process data 528 or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory, or other memory technology, CD-ROM, digital versatile disks (DVD), solid state drives (SSD), or other optical storage, magnetic cassettes, magnetic tape, magnetic disk storage, or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. one or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for corrosion reduction for SCWG through seeded sacrificial metal. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 6:
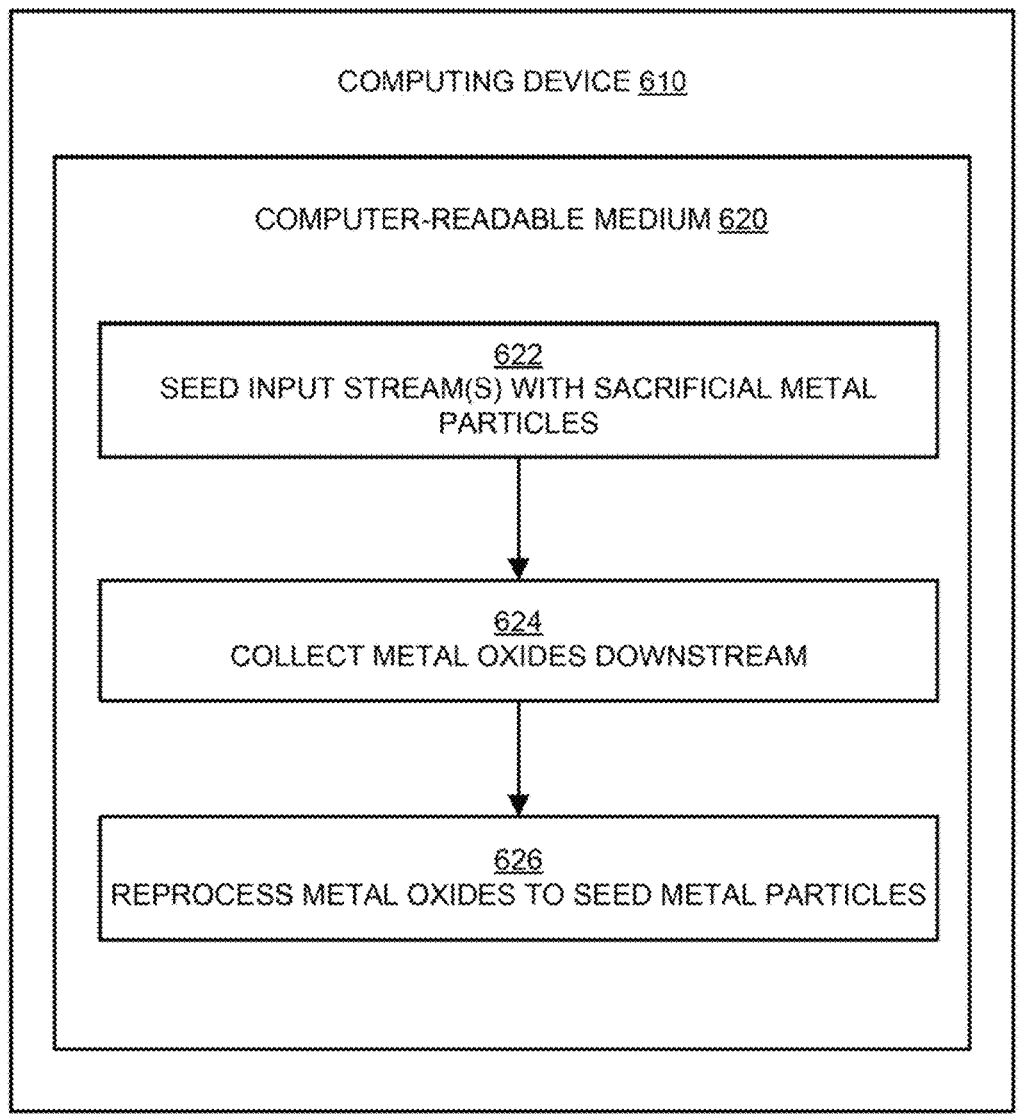
FIG. 6 is a flow diagram illustrating an example method for controlling a SCWG reactor that may be performed by a computing device such as the computing device in FIG. 5.

FIG. 6 is a flow diagram illustrating an example method for controlling a SCWG reactor that may be performed by a computing device such as the computing device in FIG. 5, arranged in accordance with at least some embodiments described herein.

Example methods may include one or more operations, functions or actions as illustrated by one or more of blocks 622, 624, and 626, and may in some embodiments be performed by a computing device such as the computing device 500 in FIG. 5. The operations described in the blocks 622-626 may also be stored as computer-executable instructions in a computer-readable medium such as a computer-readable medium 620 of a computing device 610.

An example process for reducing corrosion in supercritical water gasification through seeded sacrificial metal particles may begin with block 622, "SEED INPUT STREAM(S) WITH SACRIFICIAL METAL PARTICLES", where the sacrificial metal particles may be seeded into one or more material input streams, such as the gas fired heater 102 or slurry feed 104 in FIG. 1, through high pressure injection upstream of an SCWG reactor, for example.

Block 622 may be followed by block 624, "COLLECT METAL OXIDES DOWNSTREAM", where the precipitated metal oxide products of the seeded sacrificial reaction may separate and be collected downstream of the SCWG reactor by retrieval module 109, for example.

Block 624 may be followed by block 626, "REPROCESS METAL OXIDES TO SEED METAL PARTICLES", where the collected metal oxide products of the seeded sacrificial reaction may be reprocessed back into seed metal particles at a smelter for further process use.

Figure 7:
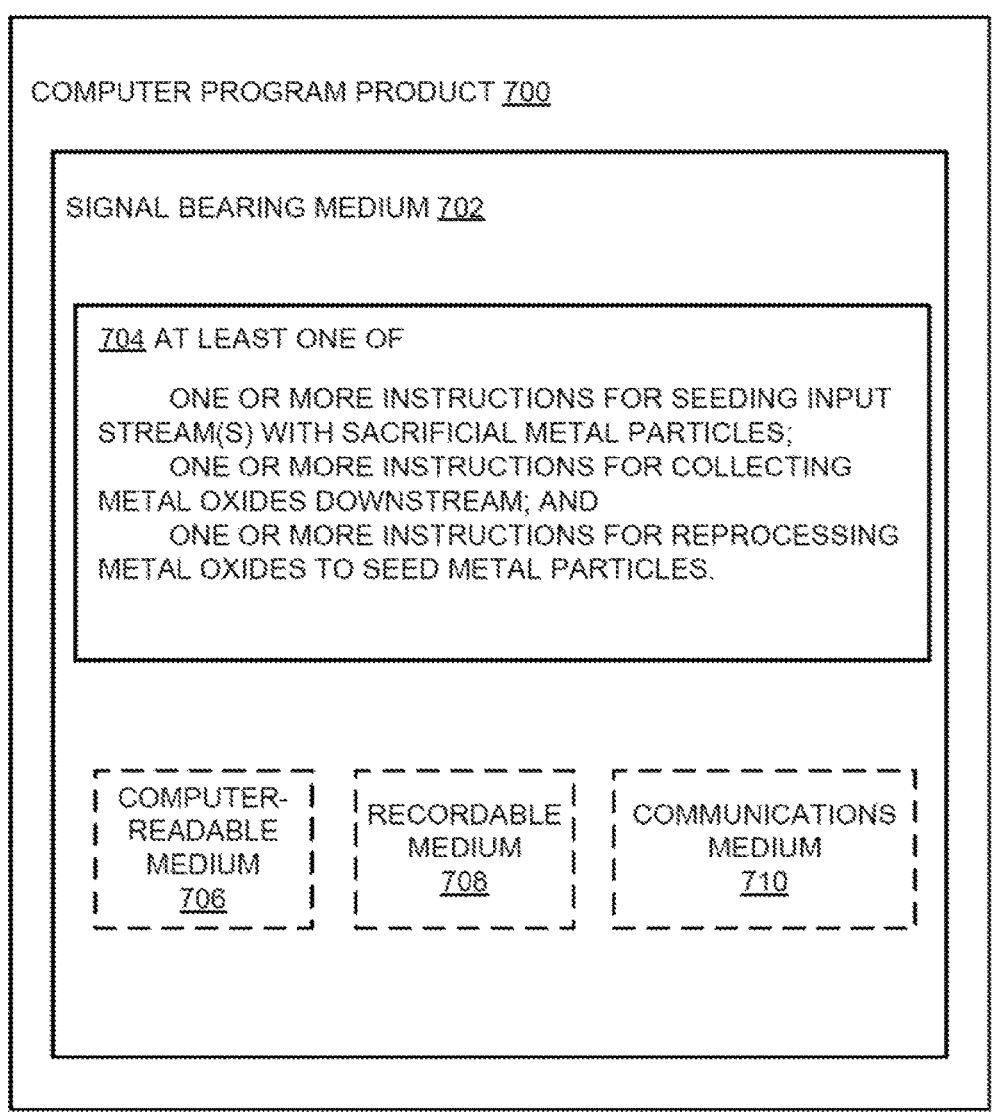
FIG. 7 illustrates a block diagram of an example computer program product, all arranged in accordance with at least some embodiments described herein.

FIG. 7 illustrates a block diagram of an example computer program product, arranged in accordance with at least some embodiments described herein.

In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the process management controller 522, the SCWG module 525, and the seed metal control module 526 may undertake one or more of the tasks shown in FIG. 7 in response to the instructions 704 conveyed to the processor 504 by the signal bearing medium 702 to perform actions associated with controlling a SCWG reactor as described herein. Some of those instructions may include, for example, seeding input stream(s) with sacrificial metal particles, collecting metal oxides downstream, and reprocessing metal oxides to seed metal particles, according to some embodiments described, herein.

In some implementations, the signal bearing medium 702 depicted in FIG. 7 may encompass a computer-readable medium 706, such as, but not limited to, a hard disk drive (HDD), a solid state drive (SSD), a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communication medium 710, such as, but not limited to, a digital and/or an analog communication medium (for example, a fiber optic cable, a waveguide, a wired communications link, a wireless communication link, etc). Thus, for example, the computer program product 700 may be conveyed to one or more modules of the processor 504 by an RE signal bearing medium, where the signal bearing medium 702 is conveyed by the wireless communications medium 710 (for example, a wireless communications medium conforming with the IEEE 802.11 standard).

According to some examples, a method is provided for reducing corrosion in supercritical water gasification. The method may include seeding one or more material input streams into a supercritical water gasification (SCWG) reactor with metal particles such that the metal particles corrode to metal oxides on SCWG reactor walls and precipitate above a supercritical point. The method may further include collecting the metal oxides from the SCWG reactor.

According to other examples, the method may further include collecting the metal oxides downstream of the SCWG reactor or reprocessing the collected metal oxides into the metal particles at a smelter. The material input streams may include a water input and a coal slurry, tar, tar sands, heavy oils, biomass, and/or waste oil input. The method may also include distributing the metal particles within the SCWG reactor after seeding and prior to collecting to ensure substantially even protection against corrosion on the SCWG reactor walls.

According to further examples, the method may include selecting one or more of a type, a density, an oxidation property, a quantity, a size, and a. shape of the metal particles to increase the corrosion of the metal particles inside the SCWG reactor. The metal particles may include one or more of Magnesium, Aluminum, Iron, Steel, Copper, and Titanium. The method may further include selecting a composition of the metal particles prior to seeding based on a chemical composition of reactants within the SCWG reactor, substantially maximizing a surface area of the metal particles prior to seeding, or selecting a. composition of the metal particles prior to seeding to reduce corrosion in one or more pumps feeding the SCWG reactor.

According to yet other examples, the method may include selecting the metal particles from two or more distinct metals prior to seeding with different oxidation properties. Seeding the one or more material input streams with metal particles may include injecting the metal particles continuously, where the metal particles may be collected continuously or over one or more predefined periods. Seeding the one or more material input streams with metal particles may also include injecting the metal particles over one or more predefined periods, where the metal particles may be collected continuously or over one Of more predefined periods.

According to other examples, a supercritical water gasification (SCWG) reactor system with corrosion reduction is described. The SCWG reactor system may include a SCWG reactor that may be configured to heat a mixture that includes water above a supercritical point. The SCWG reactor system may further include a first input configured to provide the mixture to the SCWG reactor, a second input configured to provide water to the SCWG reactor, and an output configured to retrieve a reaction mixture out of the SCWG reactor. One or more of the first and second inputs may be seeded with metal particles such that the metal particles corrode to metal oxides on SCWG reactor walls and precipitate above the supercritical point, and the metal oxides may be collected from the SCWG reactor.

According to some examples, the mixture may include one or more of: coal, tar, tar sands, heavy oils, biomass, and/or waste oil. The metal oxides may be collected downstream of the SCWG reactor. The collected metal oxides may be reprocessed into the metal particles. The metal particles may be distributed within the SCWG reactor after seeding and prior to collecting to ensure substantially even protection against corrosion on the SCWG reactor walls. One or more of a type, a density, an oxidation property, a quantity, a size, and a shape of the metal particles may be selected to increase the corrosion of the metal particles inside the SCWG reactor.

According to yet other examples, the metal particles may include one or more of Magnesium, Aluminum, Iron, Steel, Copper, and Titanium. A composition of the metal particles may be selected prior to seeding based on a chemical composition of reactants within the SCWG reactor. A surface area of the metal particles may be substantially maximized prior to seeding. A composition of the metal particles may be selected prior to seeding to reduce corrosion in one or more pumps feeding the SCWG reactor. The metal particles may be selected from two or more distinct metals with different oxidation properties prior to seeding.

According to further examples, a controller for a supercritical water gasification (SCWG) reactor system with corrosion reduction is described. The controller may include one or more injection modules coupled to one or more material input streams of a SCWG reactor, where the injection modules may be configured to seed the one or more material input streams with metal particles such that the metal particles corrode to metal oxides on SCWG reactor walls and precipitate above a supercritical point. The controller may further include at least one retrieval module coupled to an output of the SCWG reactor, where the retrieval module may be configured to collect the metal oxides from the SCWG reactor.

According to some examples, the retrieval module may be configured to collect the metal oxides downstream of the SCWG reactor. The controller may also include a reprocessing module configured to reprocess the collected metal oxides into the metal particles. The injection modules may further be configured to distribute the metal particles within the SCWG reactor after seeding and prior to collecting to ensure substantially even protection against corrosion on the SCWG reactor walls. The injection modules may be configured to distribute the metal particles within the SCWG reactor after seeding and prior to collecting through high pressure injection into the one or more material input streams.

According to other examples, the injection modules may be configured to develop a vortex within the SCWG reactor. The injection modules may further be configured to select one or more of a type, a density, an oxidation property, a quantity, a size, and a shape of the metal particles to increase the corrosion of the metal particles inside the SCWG reactor. The metal particles may include one or more of Magnesium, Aluminum, Iron, Steel, Copper, and Titanium. The injection modules may further be configured to select a composition of the metal particles prior to seeding based on a chemical composition of reactants within the SCWG reactor. A surface area of the metal particles may be substantially maximized prior to seeding.

According to yet other examples, the injection modules may further be configured to select a composition of the metal particles prior to seeding to reduce corrosion in one or more pumps feeding the SCWG reactor. The injection modules may further be configured to select the metal particles from two or more distinct metals with different oxidation properties prior to seeding. The injection modules may be configured to seed the one or more material input streams with the metal particles continuously, where the retrieval module may be configured to collect the metal oxides continuously or over one or more predefined periods. The injection modules may also be configured to seed the one or more material input streams with the metal particles over one or more predefined periods, where the retrieval module may be configured to collect the metal oxides continuously or over one or more predefined periods.

EXAMPLES

Following are illustrative examples of how some embodiments may be implemented, and are not intended to limit the scope of embodiments in any way.

Example 1: Sacrificial Seeding of Aluminum Particles to Reduce Corrosion in SCWG Process Converting Pressed Wine Grape Residues and Greenhouse Biomass into Hydrogen-Rich Gas Pressed wine grape residues and greenhouse biomass may be used as feedstock to produce hydrogen-rich fuel gas through a SCWG process. To prevent corrosion throughout the process, spherical aluminum particles 6 nm in diameter may be seeded continuously into the material inputs for water and biomass through high pressure injection upstream of a SCWG reactor. Seeding the particles upstream may prevent expensive shutdowns of continuous SCWG processes allowing for the continuous addition of particles. The aluminum particles may distribute evenly throughout the working fluids within the SCWG reactor and sacrificially corrode at the high temperatures and pressures created within the reactor. Due to the highly electrolytic properties of the working fluid mix just below the critical point where corrosion is most aggressive and the non-polar state of water above the critical point, oxide alumina, a metal oxide of aluminum may precipitate out and be collected at the output of the SCWG reactor. Once collected, the oxide alumina may be reprocessed back at a smelter to produce aluminum, which may then be used in further sacrificial seeding for SCWG processes. The oxide alumina may also be sold to outside smelters to offset the cost of the aluminum.

Example 2: Sacrificial Seeding of Steel Particles to Reduce Corrosion in SCWG Process Converting Moisture-Rich Biomass into Renewable Hydrogen Gas An SCWG process may be implemented to convert moisture-rich biomass to clean, renewable hydrogen gas. To prevent corrosion throughout the process, flake-shaped steel particles 9 nm×12 nm may be seeded in a batch process into the material inputs for water and biomass through high pressure injection upstream of a SCWG reactor. The amount of time between each batch injection and the amount of steel particles in each batch injection may depend on the corrosion rate of the inside of the nickel alloy reactor walls of the SCWG reactor and the throughput of the biomass and water. The steel particles may distribute evenly throughout working fluids within the SCWG reactor through the high pressure injection and sacrificially corrode at the high temperatures and pressures created within the reactor. Hydrated iron oxide and/or hematite, metal oxides of steel, may precipitate out and be collected downstream of the SCWG reactor. Once collected, the hydrated iron oxide and/or hematite may be reprocessed back at a smelter to produce steel which may then be re-used in further sacrificial seeding for SCWG processes.

Example 3: Sacrificial Seeding of Aluminum and Titanium Particles to Reduce Corrosion in SCWG Process Converting Glycerol into Methanol An SCWG process may be implemented to reform glycerol in supercritical water, using methanol as feedstock along with vegetable oil and a catalyst. The products of reformation may then be synthesized into renewable supermethanol. To prevent corrosion throughout the process, different types of seed metal may be added to the process with different reaction rates to control corrosion at different stages of the processes. Spherical Iron particles 6 nm in diameter may initially be seeded continuously into the material inputs for water and tar through high pressure injection upstream of a SCWG reactor. Spherical titanium particles 9 nm in diameter may then be seeded in batches through high pressure injection further downstream than the initially seeded Iron particles so the titanium, a less reactive metal, may provide corrosion protection later in any heat exchangers downstream. The metal particles may distribute evenly throughout working fluids within the SCWG reactor and sacrificially corrode at the high temperatures and pressures created within the reactor. Due to the highly electrolytic properties of the working fluid mix just below the critical point where corrosion is most aggressive and the non-polar state of water above the critical point, iron oxide and titanium dioxide, metal oxides produced from iron and titanium respectively, may precipitate out and be collected downstream of the SCWG reactor. Once collected, the iron oxide and titanium dioxide may be reprocessed back at a smelter to produce Iron and Titanium respectively, which may then be used in further sacrificial seeding for SCWG processes.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example, as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, a solid state drive (SSD), etc.; and a transmission type medium such as a digital and/or an analog communication medium (for example, a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (for example, feedback for sensing position and/or velocity of gantry systems; control motors for moving and/or adjusting components and/or quantities).

A system may be implemented using, any suitable commercially available components, such as those typically found in water gassification systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved.

Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting, and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the an that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc). It will be further understood by those within the an that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to Imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. in addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C. etc." is used, in general, such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to reduce corrosion in supercritical water gasification, wherein the method comprises:
    selecting a composition that comprises metal particles based on a chemical composition of reactants within a supercritical water gasification (SCWG) reactor;
    seeding one or more material input streams with the selected composition that comprises the metal particles and injecting the seeded one or more material input streams into the SCWG reactor, wherein the metal particles are more electronegative and corrode to metal oxides preferentially than metal of SCWG reactor walls and precipitate above a supercritical point; and
    collecting the metal oxides from the SCWG reactor.

2. The method of claim 1, further comprising:
    collecting the metal oxides downstream of the SCWG reactor.

3. The method of claim 1, further comprising:
    reprocessing the collected metal oxides into the metal particles at a smelter.

4. The method of claim 1, further comprising:
    distributing the metal particles within the SCWG reactor after the seeding and prior to collecting to ensure substantially even protection against corrosion of the SCWG reactor walls.

5. The Method of claim 1, fi ether comprising:
    selecting the composition that comprises the metal particles prior to the seeding to reduce corrosion in one or more pumps feeding the SCWG reactor.

6. The method of claim 1, further comprising:
    selecting the metal particles from two or more distinct metals with different oxidation properties prior to the seeding.

7. A supercritical water gasification (SCWG) reactor system with corrosion reduction, wherein the SCWG reactor system comprises:
- a SCWG reactor configured to heat a mixture that includes water above a supercritical point;
- a first input configured to provide the mixture to the SCWG reactor;
- a second input configured to provide water to the SCWG reactor;
- an output configured to retrieve a reaction mixture out of the SCWG reactor, wherein one or more of the first and second inputs are further configured to seed one or more of first or second input streams with a composition that comprises metal particles, wherein the metal particles are more electronegative and corrode to metal oxides preferentially than metal of SCWG reactor walls and precipitate above the supercritical point; and
- one or more collection modules configured to collect the metal oxides from the SCWG reactor.

8. The SCWG reactor system of claim 7, wherein the metal particles are distributed within the SCWG reactor after seeding and prior to collecting to ensure substantially even protection against corrosion on the SCWG reactor walls.

9. The SCWG reactor system of claim 7, wherein the composition of the metal particles is selected prior to seeding based on a chemical composition of reactants within the SCWG reactor.

10. The SCWG reactor system of claim 7, wherein the composition of the metal particles is selected prior to seeding to reduce corrosion in one or more pumps feeding the SCWG reactor.

11. The SCWG reactor system of claim 7, wherein the metal particles are selected from two or more distinct metals with different oxidation properties prior to seeding.

12. A supercritical water gasification (SCWG) reactor system with corrosion reduction, wherein the SCWG reactor system comprises:
- a SCWG reactor;
- a controller of the SCWG reactor;
- one or more injection modules coupled to one or more material input streams of the SCWG reactor and at least one retrieval module coupled to an output stream of the SCWG reactor, wherein the controller of the SCWG reactor manages:
- the one or more injection modules configured to:
  - select a composition of metal particles to reduce corrosion in one or more pumps feeding the SCWG reactor,
  - maximize surface area of the metal particles,
  - seed the metal particles, wherein the metal particles are more electronegative and corrode to metal oxides preferentially than metal of SCWG reactor walls and precipitate above a supercritical point; and
- the at least one retrieval module configured to:
  - collect the metal oxides from the SCWG reactor continuously or over one or more periods.

13. The SCWG reactor system of claim 12, wherein the at least one retrieval module is further configured to:
- collect the metal particles downstream of the SCWG reactor.

14. The SCWG reactor system of claim 12, further comprising
- a reprocessing module configured to:
  - reprocess the collected metal oxides into the metal particles.

15. The SCWG reactor system of claim 12, wherein the one or more injection modules are further configured to:
- distribute the metal particles within the SCWG reactor after seeding and prior to collecting to ensure substantially even protection against corrosion on the SCWG reactor walls.

16. The SCWG reactor system of claim 15, wherein the one or more injection modules are further configured to:
- distribute the metal particles within the SCWG reactor after seeding and prior to collecting through high pressure injection into the one or more material input streams.

17. The SCWG reactor system of claim 15, wherein the one or more injection modules are further configured to:
- develop a vortex within the SCWG reactor.

18. The SCWG reactor system of claim 12, wherein the one or more injection modules are further configured to:
- select the composition of the metal particles prior to seeding based on a chemical composition of reactants within the SCWG reactor.

19. The SCWG reactor system of claim 12, wherein the surface areas of the metal particles is substantially maximized prior to seeding.

20. The SCWG of claim 12, wherein the one or more injection modules are further configured to:
- select the metal particles from two or more distinct metals with different oxidation properties prior to seeding.

* * * * *

UNITED STATES PATENT AND TRADEMARK OFFICE
CERTIFICATE OF CORRECTION

PATENT NO.       : 9,732,292 B2
APPLICATION NO.  : 14/767188
DATED            : August 15, 2017
INVENTOR(S)      : Adam It is certified that error appears in the above-identified patent and that said Letters Patent is hereby corrected as shown below:

On the Title Page

In Item (71), under "Applicant", in Column 1, Line 1-2, delete "Empire Technology Development LLC, Wilmington (DE)" and insert -- Empire Technology Development LLC, Wilmington, DE (US) --, therefor.

In Item (57), under "Abstract", in Column 2, Lines 1-2, delete "M supercritical" and insert -- in supercritical --, therefor.

In Item (57), under "Abstract", in Column 2, Line 3, delete "panicles" and insert -- particles --, therefor.

In the Specification

In Column 1, Line 4, below Title, insert -- CROSS-REFERENCE TO RELATED APPLICATIONS --.

In Column 1, Line 18, delete "paint. Supercritical" and insert -- point. Supercritical --, therefor.

In Column 1, Line 49, delete "inc hide" and insert -- include --, therefor.

In Column 3, Line 8, delete "limited, net" and insert -- limited net --, therefor.

In Column 3, Line 12, delete "described, herein." and insert -- described herein. --, therefor.

In Column 4, Lines 5-6, delete "sacrificial, reaction," and insert -- sacrificial reaction, --, therefor.

In Column 5, Line 35, delete "(GOA)" and insert -- (GtM) --, therefor.

In Column 5, Line 46, delete "Combining, the" and insert -- Combining the --, therefor.

Signed and Sealed this
Twenty-eighth Day of November, 2017

Joseph Matal
*Performing the Functions and Duties of the
Under Secretary of Commerce for Intellectual Property and
Director of the United States Patent and Trademark Office*

CERTIFICATE OF CORRECTION (continued)

U.S. Pat. No. 9,732,292 B2

In Column 5, Line 50, delete "equilibrium" and insert -- equilibria --, therefor.

In Column 6, Line 29, delete "organic. substrates" and insert -- organic substrates --, therefor.

In Column 6, Line 52, delete "seeded to the" and insert -- seeded into the --, therefor.

In Column 7, Line 25, delete "pan" and insert -- part --, therefor.

In Column 8, Line 12, delete "552. one" and insert -- 552. One --, therefor.

In Column 9, Lines 46-47, delete "described, herein." and insert -- described herein. --, therefor.

In Column 9, Line 61, delete "etc)." and insert -- etc.). --, therefor.

In Column 9, Line 63, delete "RE" and insert -- RF --, therefor.

In Column 10, Line 22, delete "a. shape" and insert -- a shape --, therefor.

In Column 10, Line 30, delete "a. composition" and insert -- a composition --, therefor.

In Column 10, Line 44, delete "one Of more" and insert -- one or more --, therefor.

In Column 12, Line 30, delete "aluminum may" and insert -- aluminum, may --, therefor.

In Column 14, Line 57, delete "using, any" and insert -- using any --, therefor.

In Column 15, Line 15, delete "interacting, and/or" and insert -- interacting and/or --, therefor.

In Column 15, Line 23, delete "an" and insert -- art --, therefor.

In Column 15, Line 30, delete "etc)." and insert -- etc.). --, therefor.

In Column 15, Line 31, delete "an" and insert -- art --, therefor.

In Column 15, Line 39, delete "Imply" and insert -- imply --, therefor.

In Column 15, Line 48, delete "recitations. in" and insert -- recitations. In --, therefor.

In Column 15, Line 56, delete "C. etc." and insert -- "C, etc."" --, therefor.

In the Claims

In Column 16, Line 60, in Claim 5, delete "Method of claim 1, fi ether" and insert -- method of claim 1, further --, therefor.

CERTIFICATE OF CORRECTION (continued)
U.S. Pat. No. 9,732,292 B2

In Column 18, Line 41, in Claim 19, delete "areas" and insert -- area --, therefor.

In Column 18, Line 43, in Claim 20, delete "SCWG of" and insert -- SCWG reactor of --, therefor.